United States Patent
Ji et al.

(10) Patent No.: US 8,199,483 B2
(45) Date of Patent: Jun. 12, 2012

(54) OPTICAL DISC DRIVE RETENTION ASSEMBLY AND ELECTRONIC DEVICE UTILIZING THE SAME

(75) Inventors: Xin Ji, Shenzhen (CN); Jun-Jie Zheng, Shenzhen (CN); Wen-Hsiang Hung, Taipei Hsien (TW); Yan Zhong, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 188 days.

(21) Appl. No.: 12/787,820

(22) Filed: May 26, 2010

(65) Prior Publication Data
US 2011/0235268 A1   Sep. 29, 2011

(30) Foreign Application Priority Data
Mar. 23, 2010  (CN) .......................... 2010 1 0130423

(51) Int. Cl.
*G06F 1/16* (2006.01)
(52) U.S. Cl. .................................. 361/679.39
(58) Field of Classification Search .............. 361/679.39
See application file for complete search history.

(56) References Cited

U.S. PATENT DOCUMENTS

| | | | |
|---|---|---|---|
| 6,108,198 A * | 8/2000 | Lin | 361/679.39 |
| 6,247,944 B1 * | 6/2001 | Bolognia et al. | 439/157 |
| 6,373,695 B1 * | 4/2002 | Cheng | 361/679.39 |
| 6,781,841 B2 * | 8/2004 | Kim et al. | 361/724 |
| 6,826,044 B2 * | 11/2004 | Gan et al. | 361/679.58 |
| 7,102,886 B2 * | 9/2006 | Peng et al. | 361/679.39 |
| 7,126,817 B2 * | 10/2006 | Li | 361/679.37 |
| 7,990,725 B2 * | 8/2011 | Wu et al. | 361/730 |
| 2011/0026216 A1 * | 2/2011 | Liao et al. | 361/679.35 |
| 2011/0235267 A1 * | 9/2011 | Zheng et al. | 361/679.39 |

* cited by examiner

*Primary Examiner* — Lisa Lea Edmonds
(74) *Attorney, Agent, or Firm* — Altis Law Group, Inc.

(57) ABSTRACT

A retention assembly for securing a optical disc drive (ODD) to a main frame of an electronic device includes a bracket and a connector. The bracket is fixed to the ODD. One of the main frame and the bracket defines a guide groove, and the other includes a slide rail movably received in the guide groove. The connector is fixed to the main frame and adjacent to the guide groove or the slide rail. The ODD is aligned to electrically connect to the connector by the at least one guide groove or the at least one slide rail.

17 Claims, 4 Drawing Sheets

OPTICAL DISC DRIVE RETENTION ASSEMBLY AND ELECTRONIC DEVICE UTILIZING THE SAME

BACKGROUND

1. Technical Field

The present disclosure relates in general to retention assemblies, and particularly, to a retention assembly for an optical disc drive and an electronic device utilizing the retention assembly.

2. Description of Related Art

Electronic devices, such as desktop computers, or servers, often include optical disc drives (ODD), such as CD-ROM, and DVD-ROM to increase the functionality of the electronic device as desired.

A typical electronic device includes a main frame and an ODD secured on the main frame via a plurality of fasteners, and the ODD is electrically connected to other electronic components, such as a motherboard, via cables. However, it is often unduly time-consuming and laborious to replace the ODD, because the cables connected to the ODD must be unplugged and reconnected.

Therefore, there is room for improvement within the art.

BRIEF DESCRIPTION OF THE DRAWINGS

The components in the drawings are not necessarily drawn to scale, the emphasis instead placed upon clearly illustrating the principles of the present disclosure. Moreover, in the drawings, like reference numerals designate corresponding parts throughout the views.

DETAILED DESCRIPTION

Figure 1:
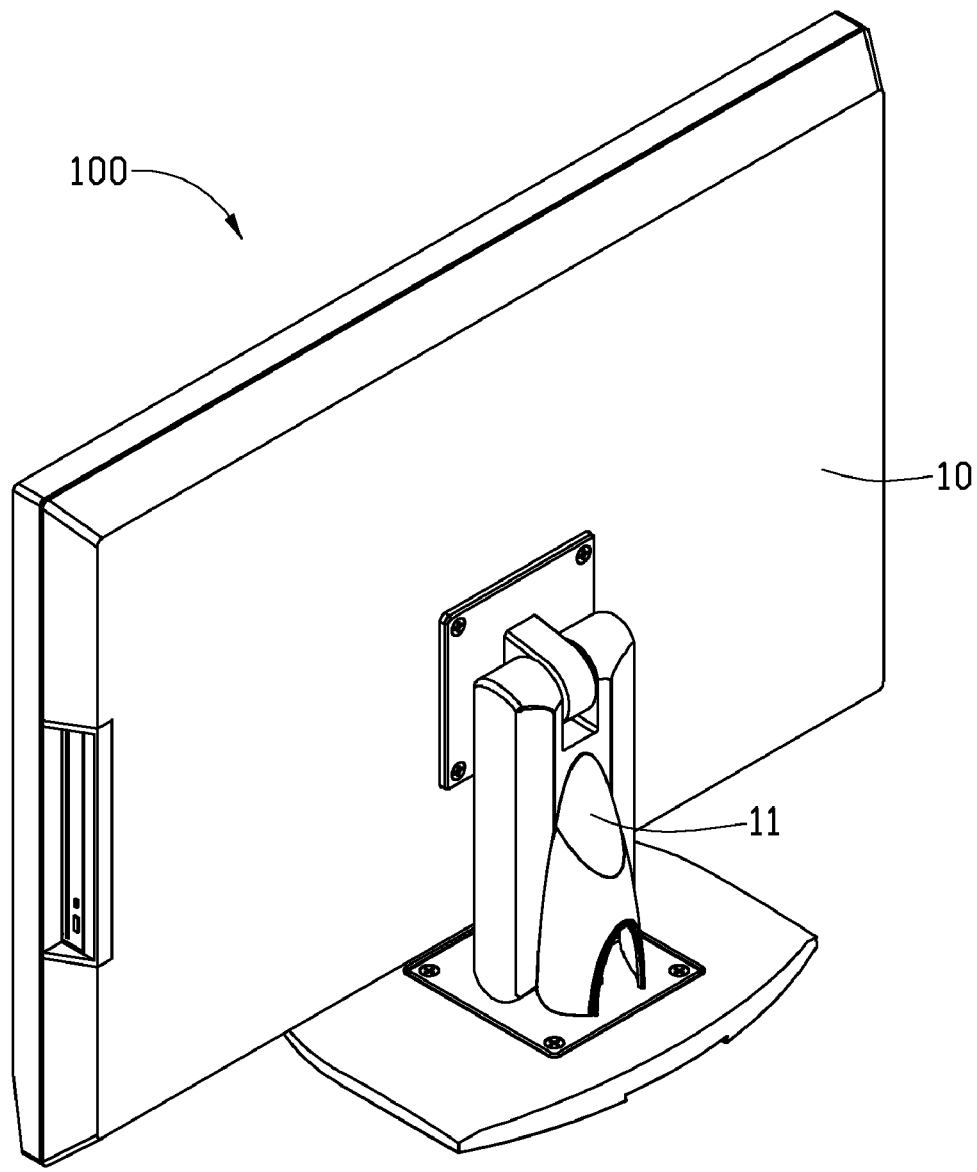
FIG. 1 is an isometric view of an embodiment of an electronic device including a host.

Referring to FIG. 1, an embodiment of the electronic device 100 includes a host 10, and a supporting mechanism 11 supporting the host 10. In the illustrated embodiment, the electronic device 100 is an all-in-one computer.

Figure 2:
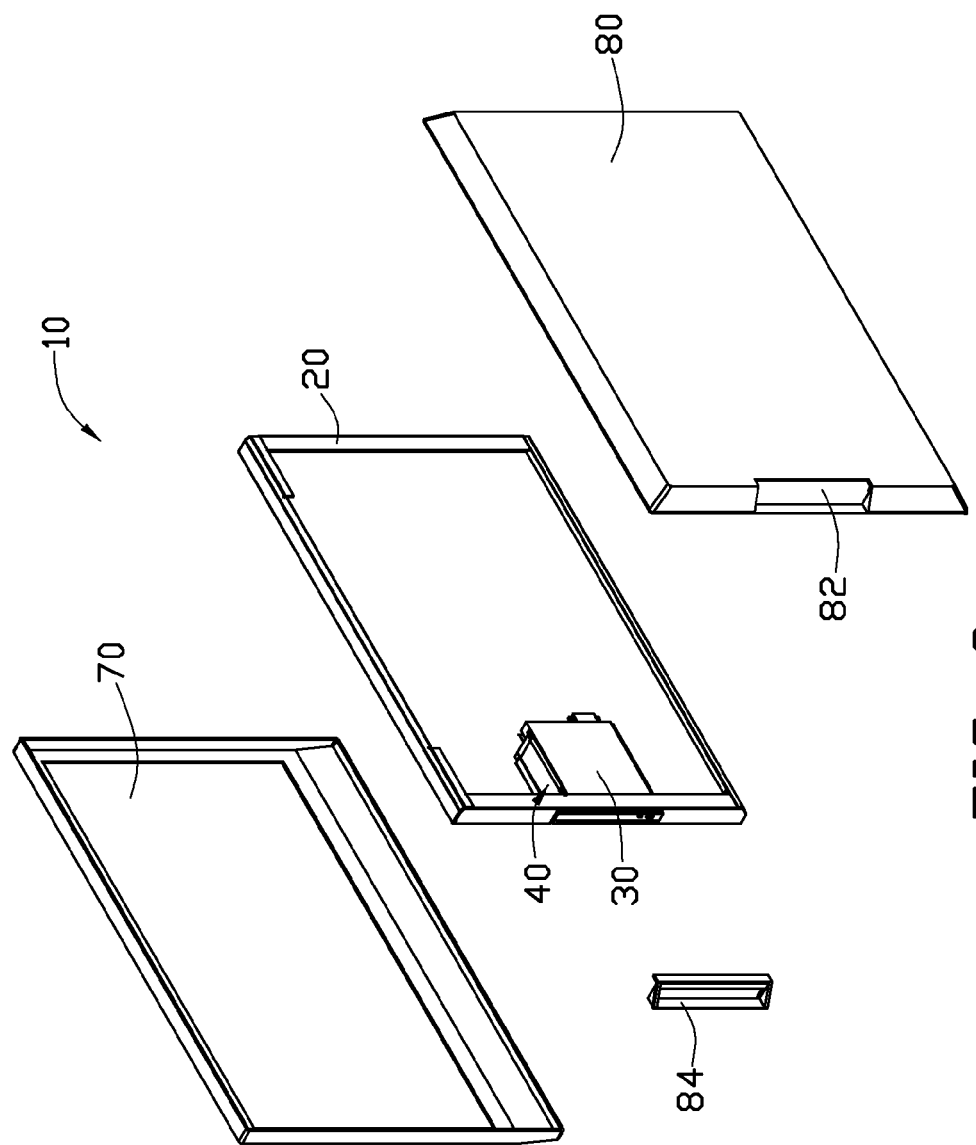
FIG. 2 is a partial, exploded, isometric view of the host of FIG. 1, the host including a retention assembly.

Referring to FIG. 2, the host 10 includes a main frame 20, an ODD 30, a retention assembly 40, a display device 70, and a housing 80.

The main frame 20 is substantially a flat plate on a side of which the ODD 30 and the retention assembly 40 are disposed. The electronic device 100 further includes a motherboard (not shown) fixed to the side of the main frame 20 and electrically connected to the ODD 30 via some cables (not shown).

Figure 3:
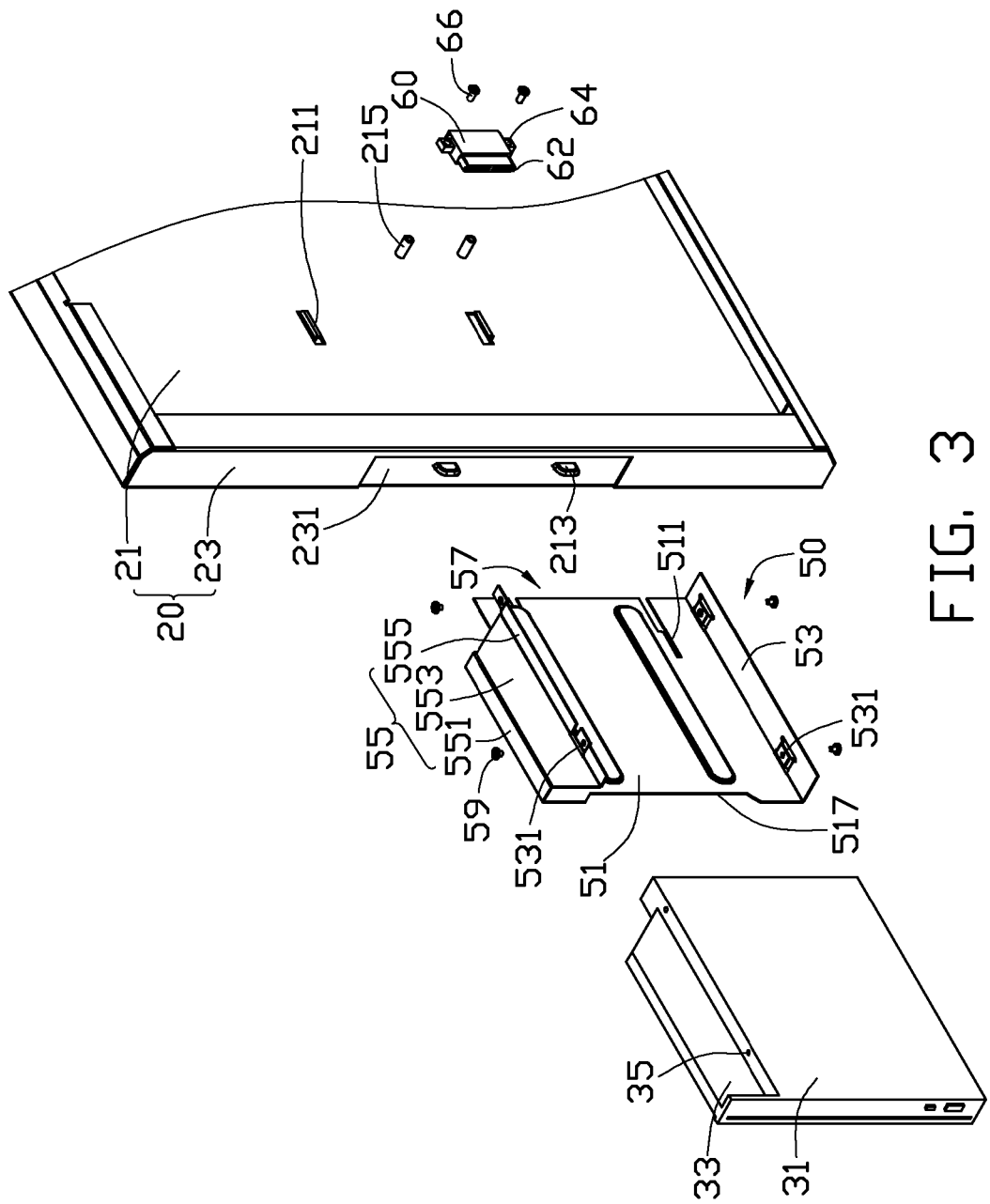
FIG. 3 is another partial, exploded, isometric view of the host of FIG. 2.
Figure 4:
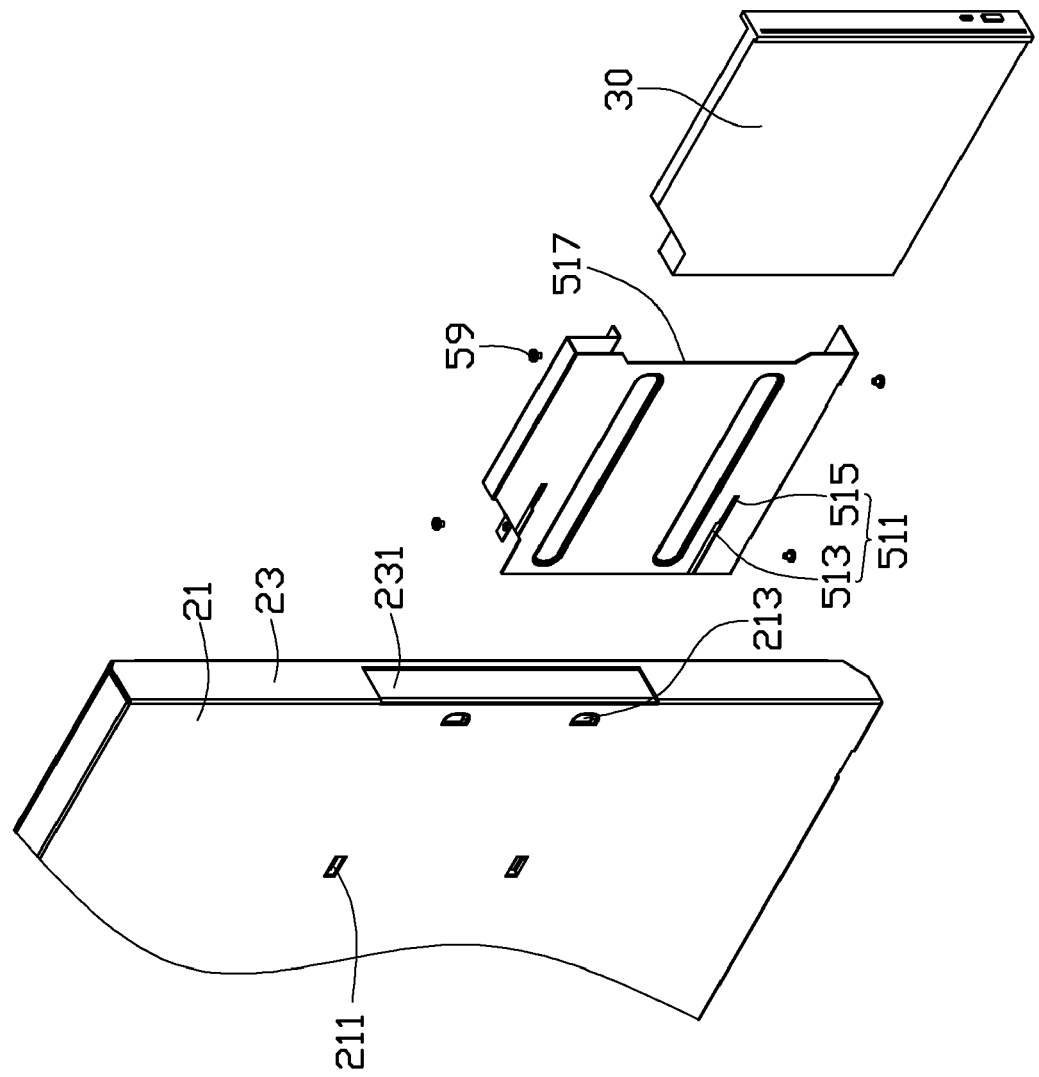
FIG. 4 is similar to FIG. 3, but viewed from another aspect.

Referring to FIGS. 3 and 4, the main frame 20 includes a substantially rectangular base plate 21, and four bent portions 23 extending outwards from four sides of the base plate 21. The base plate 21 includes two substantially parallel slide rails 211 located on a side thereof. In the illustrated embodiment, the two slide rails 211 are L-shaped and extend outwards from the side of the base plate 21 and are opposite to each other. One of the bent portions 23 defines a substantially rectangular mounting hole 231 through which the ODD 30 passes. The base plate 21 further forms two elastic positioning protrusions 213 adjacent to the mounting hole 231.

The ODD 30 includes a substantially rectangular main body 31 and a supporting plate 33 extending from an upper side of the main body 31. A thickness of the supporting plate 33 is less than that of the main body 31. The main body 31 defines two pairs of fixing holes 35 on the upper side and a lower side of the main body 31, respectively.

The retention assembly 40 includes a bracket 50 slidably attached to the frame 20, and a connector 60 fixed to the main frame 20 adjacent to the slide rails 211.

The bracket 50 includes a positioning plate 51, a first side plate 53, and a second side plate 55. The positioning plate 51, the first side plate 53, and the second side plate 55 cooperatively define a cavity 57 receiving the ODD 30. The positioning plate 51 is substantially rectangular and defines two guide grooves 511, aligned and parallel. Each guide groove 511 extends from an edge to a center portion of the positioning plate 51 and includes a guiding portion 513 and a limiting portion 515 connected to an end of the guiding portion 513. The limiting portion 515 is narrower than the guiding portion 513 and has the same width as the slide rail 211. The positioning plate 51 includes a substantially U-shaped edge 517 to latch the positioning protrusions 213.

The first side plate 53 extends substantially perpendicular to a lower side of the positioning plate 51 and defines two separated through holes 531. The second side plate 55 includes a bent portion 551 extending substantially perpendicular to an upper side of the positioning plate 51, an extending portion 553 extending substantially perpendicular to the bent portion 551, and a fixing portion 555 extending substantially perpendicular to the extending portion 553. The positioning plate 51, the bent portion 551, and the extending portion 553 cooperatively define a cavity (not labeled) to receive the supporting plate 33 of the ODD 30. The fixing portion 555 defines two separated through holes 531. The retention assembly 40 further includes four fasteners 59 received in the four fixing holes 35 after extending through the four through holes 531, such that such that the ODD 30 is fixed to the bracket 50.

The connector 60 defines a slot 62 to connect with an interface (not shown) of the ODD 30, and it is electrically connected to the motherboard via cables. The connector 60 further defines two fixing holes 64 on opposite ends of the connector 60. The base plate 21 of the main frame 20 forms two fixing columns 215 adjacent to the slide rail 211. Each fixing column 215 defines a threaded positioning hole (not labeled) along its axis. The retention assembly 40 further includes two fasteners 66 extending through the two fixing holes 64 and received in the two positioning holes of the fixing columns 215, to fix the connector 60 to the main frame 20.

Referring to FIG. 2 again, the housing 80 defines an opening 82 corresponding to the mounting hole 231. The ODD 30 can be taken out from the host 10 via the opening 82. The housing 80 includes a cover 84 to disposed on the opening 82, to prevent the ODD 30 from detaching the host 10.

In assembly, the ODD 30 is secured in the cavity 57 of the bracket 50 via the fasteners 59, and it is then moved into the housing 80 through the opening 82. When the bracket 50 passes through the mounting hole 231, the slide rails 211 slide into the guide grooves 511. When the slide rails 211 reach the limiting portions 515 of the guide grooves 511, the interface of the ODD 30 is received in the slot 62 of the connector 60, such that the ODD 30 is electrically connected to the connector 60. Concurrently, the elastic positioning protrusion 213 latches the edge 517 of the bracket 50, to restrict the movement of the bracket 50 relative to the main frame 20.

When disassembling the ODD 30, the cover 84 is dismounted from the housing 80. The bracket 50 slides along the slide rails 211, such that the ODD 30 is disconnected to the connector 60, and the ODD 30 is then withdrawn from the host 10 through the opening 52.

In the electronic device 100, the ODD 30 is aligned to electrically connect to the connector 60 by the guide groove 511 or the slide rail 211, thus, it is not necessary to perform unduly time-consuming and laborious unplugging or inserting of the cables.

The cover 84 and the elastic positioning protrusion 213 may be omitted. The slide rails 211 may be located on the bracket 50, while the guide grooves 511 are defined on the main frame 20. One or more than two slide rails 211 or guide grooves 511 may be alternatively deployed.

It is believed that the present embodiments and their advantages will be understood from the foregoing description, and it will be apparent that various changes may be made thereto without departing from the spirit and scope of the disclosure or sacrificing all of its material advantages.

What is claimed is:

1. A retention assembly for securing an optical disc drive (ODD) to a main frame of an electronic device, the retention assembly comprising:
   a bracket fixed to the ODD;
   at least one guide groove defined in one of the main frame and the bracket wherein the at least one guide groove comprises a guiding portion and a limiting portion connected to the guiding portion, and the limiting portion is narrower than the guiding portion;
   at least one slide rail located on the other of the main frame and the bracket, the at least one slide rail movably received in the at least one guide groove and having the same width as the at least one limiting portion; and
   a connector fixed to the main frame and adjacent to one of the at least one guide groove and the at least one slide rail, wherein the ODD is aligned to electrically connect to the connector by the at least one guide groove or the at least one slide rail.

2. The retention assembly of claim 1, wherein the at least one slide rails comprises two slide rails extending from a side of the main frame and being opposite to each other; and the at least one guide grooves comprises two guide grooves defined on the bracket.

3. The retention assembly of claim 1, wherein the main frame defines a mounting hole through which the ODD passes.

4. The retention assembly of claim 3, wherein the main frame forms an elastic positioning protrusion adjacent to the mounting hole to latch an edge of the bracket.

5. The retention assembly of claim 1, wherein the bracket comprises a positioning plate, a first side plate, and a second side plate, the first side plate and the second side plate extend from two sides of the positioning plate; and the positioning plate, the first side plate, and the second side plate cooperatively define a cavity to receive the ODD.

6. The retention assembly of claim 5, wherein the ODD defines a fixing hole, the bracket defines a through hole aligned with the fixing hole; and the retention assembly further comprises a fastener received in the fixing hole after extending through the through hole.

7. The retention assembly of claim 1, wherein the main frame forms a fixing column defining a positioning hole therethrough, the connector defines a through hole aligned with the positioning hole; and the retention assembly further comprises a fastener received in the positioning hole after extending through the through hole.

8. An electronic device, comprising:
   a main frame;
   an optical disc drive (ODD);
   a housing to receive the main frame, the housing defining an opening corresponding to the ODD and comprising a cover to seal the opening;
   a retention assembly for securing the ODD to the main frame; the retention assembly comprising:
   a bracket fixed to the ODD;
   at least one guide groove defined in one of the main frame and the bracket;
   at least one slide rail located on the other of the main frame and the bracket, the at least one slide rail movably received in the at least one guide groove; and
   a connector fixed to the main frame and adjacent to one of the at least one guide groove and the at least one slide rail; wherein the ODD is aligned to electrically connected to the connector by the at least one guide groove or the at least one slide rail.

9. The electronic device of claim 8, further comprising a display device, and the retention assembly and the display device are positioned on opposite sides of the main frame.

10. The electronic device of claim 8, wherein the at least one guide groove comprises a guiding portion and a limiting portion connected to the guiding portion, and the limiting portion is narrower than the guiding portion and has the same width as the at least one slide rail.

11. The electronic device of claim 8, wherein the at least one slide rails comprises two slide rails extending from a side of the main frame and being opposite to each other; and the at least one guide grooves comprises two guide grooves defined on the bracket.

12. The electronic device of claim 8, wherein the main frame defines a mounting hole through which the ODD passes.

13. The electronic device of claim 12, wherein the main frame forms an elastic positioning protrusion adjacent to the mounting hole to latch an edge of the bracket.

14. The electronic device of claim 8, wherein the bracket comprises a positioning plate, a first side plate, and a second side plate; the first side plate and the second side plate extend from two sides of the positioning plate; and the positioning plate, the first side plate, and the second side plate cooperatively define a cavity to receive the ODD.

15. The electronic device of claim 14, wherein the ODD defines a fixing hole, the bracket defines a through hole aligned with the fixing hole; and the retention assembly further comprises a fastener received in the fixing hole after extending through the through hole.

16. The electronic device of claim 8, wherein the main frame comprises a fixing column defining a positioning hole therethrough, and the connector defines a through hole aligned with the positioning hole; and the retention assembly further comprises a fastener received in the positioning hole after extending through the through hole.

17. A retention assembly, comprising:
   a bracket defining at least one guide groove, wherein the at least one guide groove comprises a guiding portion and a limiting portion connected to the guiding portion, and the limiting portion is narrower than the guiding portion;
   at least one slide rail movably received in the at least one guide groove and having a width same as a width of the at limiting portion; and
   a connector fixed to a main frame and adjacent to one of the at least one guide groove and the at least one slide rail.

* * * * *